United States Patent
Ohba et al.

(10) Patent No.: US 8,241,122 B2
(45) Date of Patent: Aug. 14, 2012

(54) IMAGE PROCESSING METHOD AND INPUT INTERFACE APPARATUS

(75) Inventors: Akio Ohba, Kanagawa (JP); Hiroyuki Segawa, Kanagawa (JP); Akira Suzuki, Tokyo (JP); Katsu Saito, Saitama (JP); Tomokazu Kake, Tokyo (JP); Michinari Kohno, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 747 days.

(21) Appl. No.: 12/307,390

(22) PCT Filed: Apr. 23, 2007

(86) PCT No.: PCT/JP2007/000442
§ 371 (c)(1),
(2), (4) Date: Feb. 26, 2009

(87) PCT Pub. No.: WO2008/004332
PCT Pub. Date: Jan. 10, 2008

(65) Prior Publication Data
US 2009/0203440 A1   Aug. 13, 2009

(30) Foreign Application Priority Data

Jul. 7, 2006 (JP) .................................. 2006-188272

(51) Int. Cl.
*A63F 13/00* (2006.01)
(52) U.S. Cl. ................ 463/32; 463/30; 463/31; 345/63; 345/77; 345/214; 345/690

(58) Field of Classification Search .................... 345/63, 345/77, 214, 690; 463/30, 31, 32
See application file for complete search history.

(56) References Cited

U.S. PATENT DOCUMENTS 5,255,211 A   10/1993   Redmond
5,319,387 A    6/1994   Yoshikawa
(Continued)

FOREIGN PATENT DOCUMENTS

JP   05127809 A   5/1993
(Continued)

OTHER PUBLICATIONS

International Preliminary Report on Patentability for corresponding PCT application PCT/JP2007/000442 dated May 28, 2008.
(Continued)

*Primary Examiner* — Matthew W Such
*Assistant Examiner* — William Harriston
(74) *Attorney, Agent, or Firm* — Matthew B. Dernier, Esq.; Gibson & Dernier LLP

(57) ABSTRACT

For an input interface apparatus for recognizing the motion of an object, there may be cases where the brightness of the object to be captured is insufficient, and thus, a camera takes an image of the object operated by the object, a depth position detector detects the position of the object based on captured frames, an action identifying unit identifies an action of the player based on a result on the detection of the object, an input receiving unit receives the action as an instruction to an input-receiving image displayed on a display, and in response to the action, an illumination control unit raises the brightness of the image projected on the display higher than that before the action is detected.

19 Claims, 8 Drawing Sheets

U.S. PATENT DOCUMENTS

| | | | |
|---|---|---|---|
| 5,763,872 A * | 6/1998 | Ness | 250/214 AL |
| 5,912,454 A * | 6/1999 | Castillo et al. | 250/205 |
| 6,771,277 B2 | 8/2004 | Ohba | |
| 7,019,736 B2 * | 3/2006 | Allen et al. | 345/207 |
| 7,394,451 B1 * | 7/2008 | Patten et al. | 361/679.41 |
| 7,599,044 B2 * | 10/2009 | Hotelling et al. | 356/3.12 |
| 7,605,780 B2 * | 10/2009 | Jung et al. | 345/63 |
| 7,710,391 B2 * | 5/2010 | Bell et al. | 345/156 |
| 2002/0049102 A1 * | 4/2002 | Taylor | 473/447 |
| 2002/0097247 A1 | 7/2002 | Ohba | |
| 2002/0186221 A1 * | 12/2002 | Bell | 345/474 |
| 2003/0122810 A1 * | 7/2003 | Tsirkel et al. | 345/207 |
| 2003/0137494 A1 | 7/2003 | Tulbert | |
| 2003/0227435 A1 * | 12/2003 | Hsieh | 345/102 |
| 2005/0122308 A1 * | 6/2005 | Bell et al. | 345/156 |
| 2005/0162381 A1 * | 7/2005 | Bell et al. | 345/156 |
| 2005/0239547 A1 * | 10/2005 | Haga et al. | 463/30 |
| 2006/0029256 A1 * | 2/2006 | Miyoshi et al. | 382/104 |
| 2006/0206733 A1 * | 9/2006 | Ono | 713/300 |
| 2006/0279477 A1 * | 12/2006 | Allen et al. | 345/30 |
| 2006/0290921 A1 * | 12/2006 | Hotelling et al. | 356/152.2 |
| 2007/0273714 A1 * | 11/2007 | Hodge et al. | 345/690 |
| 2009/0103853 A1 * | 4/2009 | Daniel | 385/13 |

FOREIGN PATENT DOCUMENTS

| | | |
|---|---|---|
| JP | 09506190 A | 6/1997 |
| JP | 10104572 A | 4/1998 |
| JP | 2002196855 A | 7/2002 |
| JP | 2003532216 A | 10/2003 |

OTHER PUBLICATIONS

Written Opinion for corresponding PCT application PCT/JP2007/000442 dated May 28, 2008 dated: Jun. 12, 2007.

Office Action for corresponding JP application JP2006-188272 dated Sep. 14, 2010.

* cited by examiner

IMAGE PROCESSING METHOD AND INPUT INTERFACE APPARATUS

TECHNICAL FIELD

The present invention relates to an input interface apparatus for recognizing the motion of an object as input and an image processing method to be used by the input interface apparatus.

BACKGROUND ART

There are known game technologies in which the motion of a player is captured with an image pickup device such as a video camera and the motion of the player is projected on a screen such that the player can play a game by inputting commands and the like.

When moving images of a player are to be used as an input interface as described above, it is necessary that the object captured by a camera has sufficient brightness. There are, however, not a few users who play their games with the illumination of the room turned down, and as such there may be cases where the object cannot be recognized correctly due to insufficient illumination. Also, due to certain limitations of the playing environment, there may be cases where it is not possible to prepare lighting equipment capable of illuminating the object sufficiently.

The present invention has been made in view of the foregoing problems, and a general purpose thereof is to provide a technology for securing the brightness of an object to be captured by an image pickup device in an input interface apparatus for recognizing the motion of the object as input.

SUMMARY OF THE INVENTION

One embodiment of the present invention provides an image processing method for taking an image of an object operated by a player and receiving a motion of the object as an instruction to an input-receiving image displayed on a display, wherein when at least the motion of the object is detected, the brightness of an image projected on the display is raised.

Here, the "object" is a general term for objects to be operated by the player within the image pickup range of a camera, which include parts of a player's body, such as the head, arm, hand, foot, mouth, and the like, objects, such as a stick, sheet, box, and the like to be operated by a part of the player's body (e.g., hand, foot, mouth), and devices, such as a controller.

By employing this embodiment, the image projected on the display can be used as a means for illuminating the objects.

Another embodiment of the present invention provides an input interface apparatus. This apparatus comprises: a camera which captures an image of an object operated by a player; a position detector which detects the position of an object based on a captured frame; an action identifying unit which identifies an action of the player based on a result of detecting the object; an input receiving unit which receives the action as an instruction to an input-receiving image displayed on a display; and an illumination control unit which raises, in response to the action, the brightness of the image projected on the display higher than that before the action is detected.

According to this embodiment, when any action is performed by the player, the image the brightness of which has been raised is displayed on the display. As a result, the illumination of a space surrounding the object increases, thereby enabling the processing such as matching of the object to be carried out accurately.

The constituting elements and implementations of the invention in the form of methods, apparatuses, systems, computer programs, recording media for storing the computer programs, and so forth may also be practiced as additional modes of the present invention.

Advantageous Effects

The present invention secures the brightness of an object to be captured in an input interface apparatus for recognizing the motion of the object as input.

EXPLANATION OF REFERENCE NUMERALS

10 Input interface apparatus, 20 Camera, 30 Image processing device, 40 Display, 50 Reflector, 52 First reflecting surface, 54 Second reflecting surface, 56 Marker, 62 First entry region, 64 Second entry region, 70 Object, 72 Player, 74 Face region, 76 Body region, 80 Input receiving image, 82 to 88 Lighting region, 112 Reflecting surface region identifying unit, 116 Illumination determining unit, 120 Face region detector, 122 Depth position detector, 132 Action identifying unit, 134 Input-receiving-image display unit, 136 Input receiving unit, 140 Illumination control unit, 146 Distance estimating unit, 148 Color analyzing unit

DETAILED DESCRIPTION OF THE INVENTION

An input interface apparatus according to an embodiment of the present invention is an apparatus for capturing an object operated by a player with a camera and receiving the motion of the object as instructions to an input-receiving image displayed on a display. Typical examples of applications using such an input interface apparatus are action games in which characters and the like displayed on the screen are operated by the motion of the player. Also, the applications include games of other types, simple business applications, album display of digital photos, reproduction of musical data, etc.

The input interface apparatus of the present embodiment realizes an improved accuracy of detecting an object by displaying a lighting region on the display to illuminate the object to be captured by the camera when the brightness of the object is insufficient and thereby increasing the illumination of the space surrounding the object.

Figure 1:
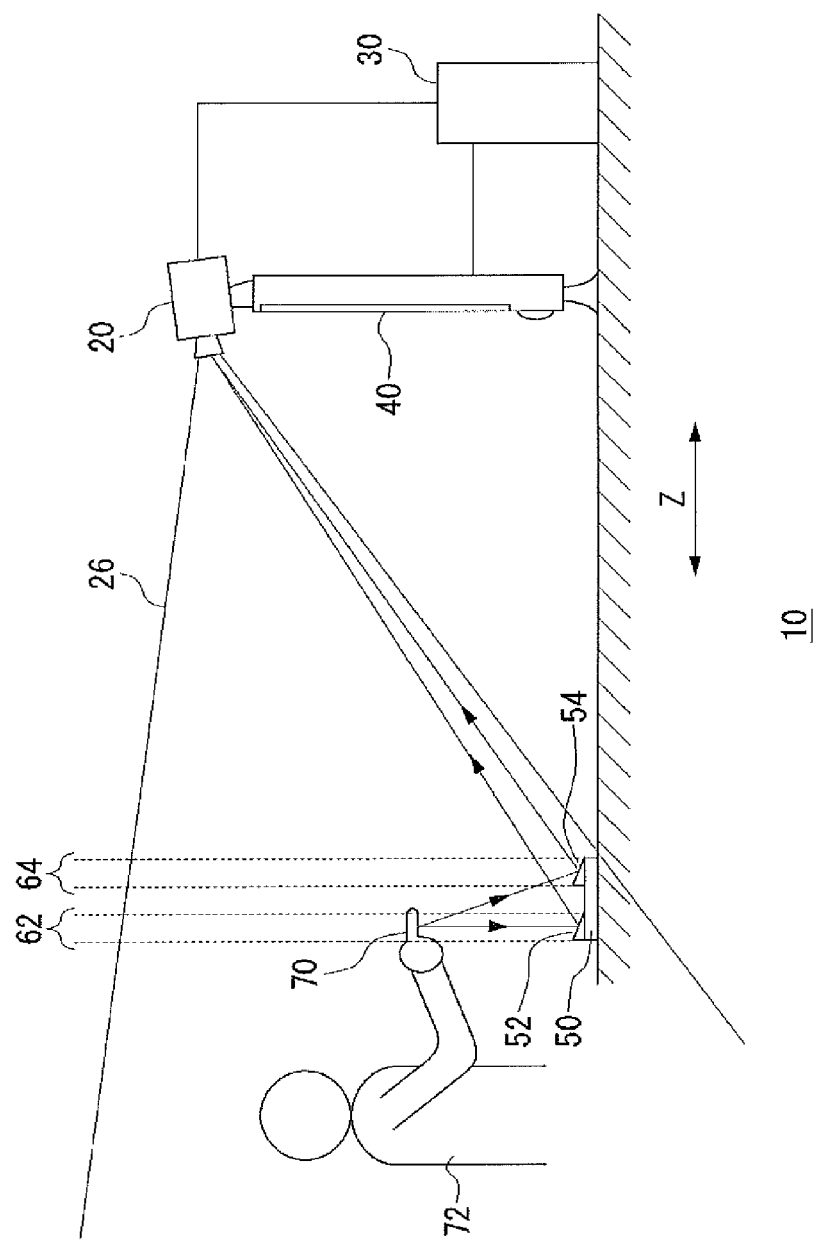
FIG. 1 illustrates a general constitution of an input interface apparatus.

FIG. 1 shows a general constitution of an input interface apparatus 10. The input interface apparatus 10 includes a display 40, a camera 20 to be placed on or above the topside of the display, an image processing device 30, and a reflector 50.

The display 40 is preferably positioned in front of a player 72. It is so configured that the player 72 operates an object while viewing his/her own image captured by the camera 20.

The camera 20 takes the image of an object 70 operated by the player 72 and outputs the frames to the image processing device 30 at a predetermined frame rate. It is preferable that the frame rate is as high as practicable in order to quicken the response of image detection. The camera 20 is placed on or above the topside of the display 40. The image pickup range 26 of the camera 20 must be so set that the camera 20 can at least capture the object 70 operated by the player 72. As a result, the player 72 is able to operate the object 70 by facing the display 40. However, depending on the characteristics of the application to be realized by the input interface apparatus 10, the camera 20 may be placed on the lower or lateral side of the display 40 or may be placed in a position different from the direction of the player 72 facing the display 40.

The frames outputted from the camera 20 are projected on the display 40 after passing through the image processing device 30. In this arrangement, it is preferable that the frames captured are subjected to a mirror image processing by the image processing device 30 and the mirror images of the player 72 are projected on the display 40. The projection of mirror images makes it easier for the player to recognize his/her own motion because if the player raises a hand, for instance, the image on the screen raises a hand on the same side as reflected on a mirror. However, the arrangement may also be such that no mirror image processing is done by the image processing device 30 and thus screen images just as captured by the camera may be projected on the display 40. Moreover, depending on the characteristics of the application to be realized by the input interface apparatus 10, screen images which are vertically inverted by the image processing device 30 may be projected on the display 40.

The image processing device 30 has a function of loading and executing application software stored in an external storage medium. The image processing device 30 carries out not only the above-mentioned mirror processing on the frames outputted from the camera 20 but also such processing as detecting the image of an object in a frame and displaying it with a predetermined image superimposed on it or giving instructions according to the action of the player to the application. Mirror images produced by predetermined processing at the image processing device 30 are outputted to the display 40. The image processing device 30 is typically a dedicated machine such as a game console, but it may also be a general-purpose personal computer or server equipped with an image input/output function. Further details and constitution of the image processing device 30 will be discussed later.

The reflector 50, which is to be placed in a position between the player 72, the display 40, and the camera 20, plays a role of having the camera 20 capture a reflected image of the object 70. The "object" as used herein is a general term for objects to be operated by the player 72 within the image pickup range 26 of the camera 20, which include parts of the player's body, such as the head, arm, hand, foot, mouth, and the like, objects, such as a stick, sheet, box, and the like to be operated by a part of the player's body (e.g., hand, foot, mouth), and devices, such as a controller. An object in motion by the will of the player, including the case of the object being a part of the body, is referred to herein as "an object operated by the player". Shown as an example in FIG. 1 is a finger of the player as an object 70.

The direct image of the object 70 is captured by the camera 20, and at the same time the reflected image from the reflector 50 is also captured by the camera 20. In other words, a frame captured by the camera 20 includes both the direct image and reflected image of the object 70. Hence, the object 70 is captured as images taken from two directions, namely, a direct image and a reflected image, with the result that, as will be discussed later, the three-dimensional position of the object 70 can be identified with images taken from a single camera only.

For the simplicity of explanation, there is only one object 70 to be operated by the player 72 in the following description, but it goes without saying that a similar processing can be accomplished even with the presence of two or more objects.

The reflector 50 is provided with two reflecting surfaces 52 and 54, and the camera 20 captures the reflected images of the object 70 reflected respectively therefrom. Accordingly, the reflecting surfaces 52 and 54 are given predetermined angles such that a reflected image of the object 70 is formed by a lens of the camera 20. Also, the location where the reflector 50 is to be placed is limited to positions a predetermined distance away from the camera 20.

Since the reflector 50 must enable the camera 20 to capture a reflected image of the object 70, the position where the reflector 50 is to be located is confined within a certain range. Therefore, in order for the player to locate the reflector 50 in a correct position, the arrangement may be such that a frame line, for instance, may be displayed on the display 40 into which the player places the reflector 50 as captured by the camera 20 by adjusting the actual position thereof.

As illustrated in FIG. 1, extending upward from a first reflecting surface 52 and a second reflecting surface 54 are respectively a first entry region 62 and a second entry region 64 which are the regions where the reflected images of the object 70 can be projected to the camera 20. The expanse of the entry regions 62 and 64, which is determined by the degree of inclination of the reflecting surfaces 52 and 54, is the area to which the object 70 is assumed to enter. In the example of FIG. 1, the entry regions 62 and 64 are set in such a manner that they do not intersect with each other. Accordingly, when the object 70 is present in the first entry region 62, a reflected image reflected from the first reflecting surface 52 is captured by the camera 20. And when the object 70 is present in the second entry region 64, a reflected image reflected from the second reflecting surface 54 is captured by the camera 20. However, if the object 70 such as a finger or a stick has a certain length in the depth direction of the reflector 50, then the object 70 can be present in both of the entry regions 62 and 64 at the same time.

Generally, when the motion of an object is to be detected based on differences between frames, it is difficult to detect it in the direction approximately parallel to the optical axis of the camera (Z direction in FIG. 1) because such motion produces only little differences in the object in frames. According to the present embodiment, therefore, an image of the object from a direction different from that of the direct image thereof is obtained using the reflection from the reflector 50, thereby making it possible to reliably detect the motion of the object in the Z direction by the use of the reflected image. Note that in the description hereinbelow the direction along the optical axis of the camera will be referred to simply as "depth direction".

Figure 2:
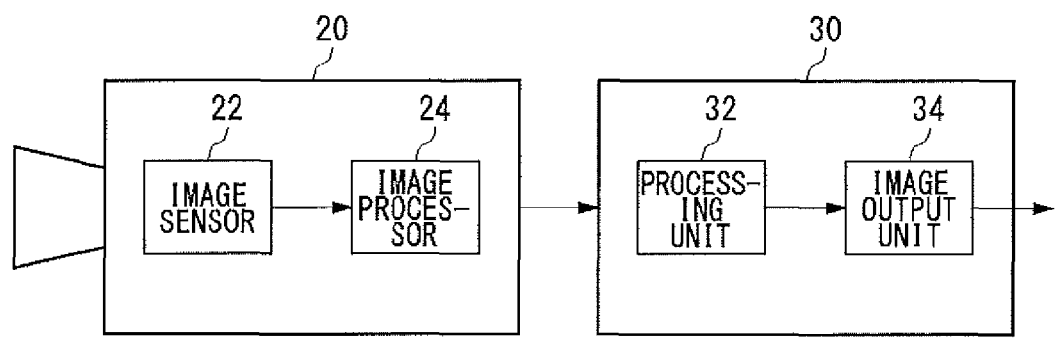
FIG. 2 illustrates a simplified hardware configuration of a camera and an image processing device.

FIG. 2 illustrates a simplified hardware configuration of a camera 20 and an image processing device 30. The camera 20 includes image sensors 22, which are image pickup devices, and an image processor 24. The image sensor 22, which is generally a CCD sensor or a CMOS sensor, obtains an image by storing an image formed by a not-shown lens in light receiving elements. An image thus captured is stored temporarily in a not-shown memory such as RAM. Detailed description of the constitution of the camera 20, which is widely known, is omitted herein.

The image processor 24, which is comprised of circuitry such as ASIC and the like, performs necessary processings, such as A/D conversion, demosaicking, white balance processing, noise removal, contrast enhancement, color difference enhancement and gamma processing, on image data outputted from the image sensor 22. The image data processed by the image processor 24 are transferred to the image processing device 30 via a not-shown communication interface. For simplicity, the image data to be transferred from the image processor 24 to the image processing device 30 are assumed in the following description to be raw data, which are the output signals from the image sensor 22 directly digitized, but the image data may also be those in other formats, for instance, JPEG or other compressed data. In the latter case, however, an image decoder for decoding the compressed data is placed before a processing unit 32 of the image processing device 30.

The image processing device 30 includes a processing unit 32 and an image output unit 34 for outputting image data delivered from the processing unit 32 to the display 40. In addition to these, the image processing unit 30 includes a loading unit which reads out application software stored in an optional recording medium, such as CD-ROM, DVD-ROM or flash memory, an application executing unit which executes a predetermined application according to the software, and so forth. Detailed description of these functions is omitted herein because they are naturally equipped in dedicated machines, such as game consoles, and personal computers.

Figure 3:
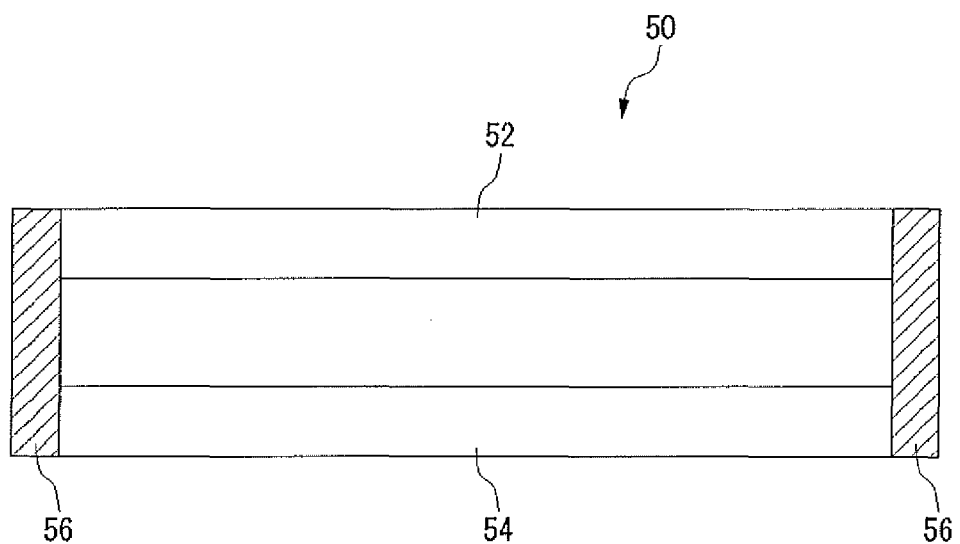
FIG. 3 is a plan view showing a structure of a reflector.

FIG. 3 is a plan view showing a structure of the reflector 50. The reflector 50, which is generally of a lamellar form, has a first reflecting surface 52 and a second reflecting surface 54 which are spaced from each other in the depth direction as already described. The reflecting surfaces 52 and 54, an example of which being a mirror, may be a metal or plastic which is given a mirror-like finishing, a glass vapor-deposited with metal, or the like. The first reflecting surface 52 and the second reflecting surface 54 are disposed parallel to each other, and the long axis thereof is approximately perpendicular to the optical axis of the camera 20. As shown in FIG. 1, the first reflecting surface 52 and the second reflecting surface 54 are set at such angles as reflect the object in a position above the reflecting surface and project the reflected image to the lens of the camera 20.

Disposed at both ends of the long axis of the reflector 50 are respective markers 56 designed to have the image processor 30 recognize the position of the reflector 50. The markers 56 may be colored portions, check or other predetermined patterns, or two-dimensional codes. Or light sources, such as LEDs, may be embedded at both ends. In short, the markers 56 may be in any form as long as they can provide information necessary in identifying the position of the reflector 50 within the frame outputted from the camera 20.

Since the reflector 50 has a predetermined width in the depth direction and is also provided with a plurality of reflecting surfaces in the depth direction, it is possible to set a plurality of entry regions 62 and 64 in the depth direction. The reflecting surfaces 52 and 54 project the reflected images in their mutually different entry regions where the object is assumed to enter to the camera 20, and have the camera 20 capture the reflected images of the object. In this manner, the movement of the object in the depth direction can be detected as will be described later.

Figure 4:
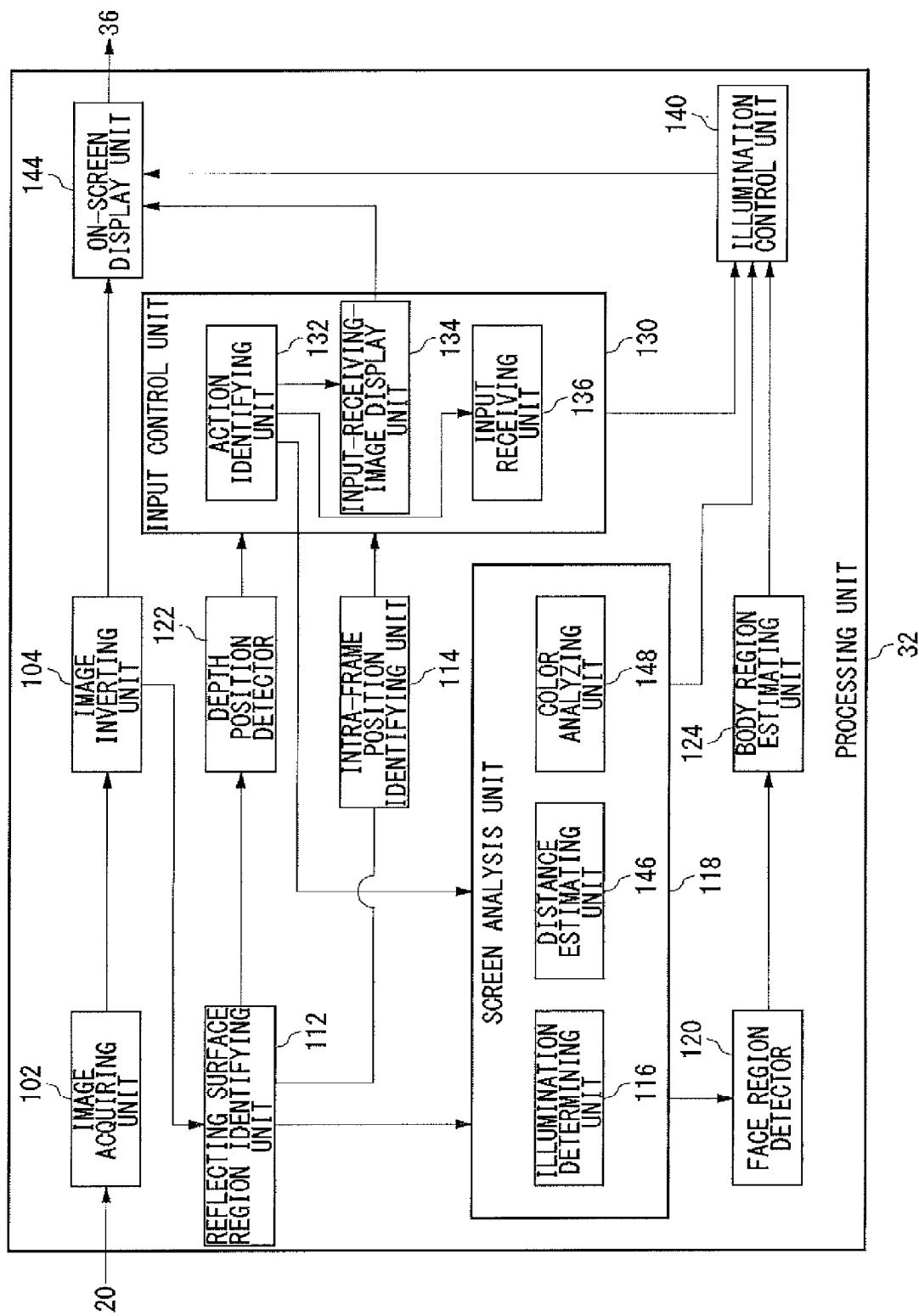
FIG. 4 illustrates a detailed structure of a processing unit.

FIG. 4 illustrates a detailed structure of the processing unit 32. The structure may be realized by a CPU, memory, memory-loaded programs and the like. Depicted herein are functional blocks realized by cooperation of those. Therefore, it will be understood by those skilled in the art that the functional blocks may be achieved by a variety of manners including hardware only, software only or a combination of both.

An image acquiring unit 102 acquires frames outputted from the camera 20 one by one and sends them to the image inverting unit 104.

The image inverting unit 104 generates mirror images by performing a mirror processing (left-right reversal of an image) on each of the frames received from the image acquiring unit 102.

A reflecting surface region identifying unit 112 identifies reflecting surface regions, which are the regions corresponding to the first reflecting surface 52 and the second reflecting surface 54 of the reflector 50, from each frame captured by the camera 20. The reflecting surface region identifying unit 112 detects markers 56 in two positions within a frame and identifies the region between them as the reflecting surface region.

A depth position detector 122 detects the position of the object in the depth direction by detecting a reflected image from the reflected surface region identified by the reflecting surface region identifying unit 112. To put it concretely, the depth position detector 122 detects the difference between reflecting surface regions in a plurality of frames by comparing them with each other. That is, if there is no reflected image in the reflecting surface region in a frame and there is one present in the reflecting surface region in the subsequent frame, it can be determined that the object is present in an entry region corresponding to the reflecting surface.

To carry out this determination accurately, it is necessary that the images of the object reflected from the first reflecting surface 52 and the second reflecting surface 54 be clearly distinguished from the other images. In one embodiment of the present invention, therefore, the arrangement may be such that the depth position detector 122 acquires a default image of the reflecting surface region before starting the identification of the three-dimensional position and determines the presence of the object in the entry region when a difference is detected between the default image and a reflecting surface region in any frame.

The depth position detector 122 determines whether the object has entered each of the first entry region 62 and the second entry region 64 or not by carrying out the above-described processing on the reflecting surface regions corresponding to the first reflecting surface 52 and the second reflecting surface 54. The result of this determination is sent to the input control unit 130.

An intra-frame position identifying unit 114 identifies the position of the object in a frame. The intra-frame position identifying unit 114 identifies the position of the object in a frame by carrying out a well-known pattern matching using a reference image (template) of the object on a frame received from the image inverting unit 104. The matching may be carried out on the frame itself as received from the image inverting unit 104 or on the frame minus the reflecting surface region identified by the reflecting surface region identifying unit 112.

The intra-frame position identifying unit 114 stores a reference image which is prepared in advance to help identify the object. Suppose, for example, the object is a hand, then the reference image to be stored may be one prepared by averaging the images of hands belonging to tens or thousands of persons or may be a plurality of reference images classified according to the age, sex, build or the like of the players. Any optional one may be used as the matching technology using reference images. Detailed description of such technology, which is well-known to persons skilled in the art, is omitted herein. The information of the intra-frame position of the object identified by the intra-frame position identifying unit 114 is delivered to the input control unit 130.

An input control unit 130 gives instructions based on the information obtained by the image processing on frames captured by the camera 20 to a not-shown application executing unit which executes games or other applications. The input control unit 130 includes an action identifying unit 132, an input-receiving-image display unit 134, and an input receiving unit 136.

The action identifying unit 132 identifies the action of the player by detecting the movement of the object 70 in the depth direction between the first entry region 62 and the second entry region 64 based on the results of detection of the depth position by the depth position detecting unit 122. The action identifying unit 132 may identify the movement of the object 70 in the depth direction toward the camera 20 and the movement thereof away from the camera 20 as actions of different players. The action identifying unit 132 gives the information on the thus identified action to the input-receiving-image display unit 134, the input receiving unit 136, and an illumination control unit 140.

The input-receiving-image display unit 134 outputs an input receiving image for receiving input instructions according to the motion of the object 70 in superposition on a direct image of the object captured by the camera 20 to an on-screen display unit 144. As examples of input receiving images, there are images of pointers such as cursors, tools such as musical instruments or weapons, and input devices such as keyboards or calculators. The input-receiving-image display unit 134 may display input receiving images of different display modes between when the object is positioned in the first entry region 62 corresponding to the first reflecting surface 52 and when it is positioned in the second entry region 64 corresponding to the second reflecting surface 54.

The input receiving unit 136 receives a given action as instructions to an input-receiving image and gives the instructions to the not-shown application executing unit.

In response to the action, the illumination control unit 140 outputs a lighting region with a higher lightness or brightness than that of the captured frame to the on-screen display unit 144, thereby raising the brightness of the image projected on the display 40 higher than that before the action is detected. The illumination control unit 140 uses the part of the whole image excluding the input receiving image as the lighting region. The illumination control unit 140 may cause the lighting region to be displayed when the illumination of the object is determined to be insufficient by an illumination determining unit 116 or may adjust the parameter of the lighting region based on the brightness of a space to be image-taken.

A screen analysis unit 118 includes an illumination determining unit 116, a distance estimating unit 146, and a color analyzing unit 148.

The illumination determining unit 116 determines whether the illumination of the space to be captured by the camera 20 including the object 70 is sufficient or not. The illumination determining unit 116 may determine the illumination of the space to be captured by analyzing the frame or based on an output signal from a photosensor which may be provided on a part of the camera 20, the image processing device 30, or the display 40. The determination of whether the illumination is sufficient or not is made by reference to the ability to accurately carry out the matching of the object within the frame. One example of reference may be a level of illumination experimentally determined as necessary for an assumed distance (e.g., 1 meter) between the display 40 and the player 72. Or an appropriate one may be selected from a plurality of reference values which are prepared in advance for distances between the display 40 and the player 72 to be estimated by the depth position detector 122 or the distance estimating unit 146 to be described later.

The distance estimating unit 146 estimates the distance of the object in the space to be captured from the display 40, based on the frames captured when the right and left lighting regions are displayed alternately on the display 40. The details will be discussed later by reference to FIG. 8.

The color analyzing unit 148 acquires color information on the object in the space to be captured, based on the frames captured when a single-color lighting region is displayed alternately for a plurality of colors on the display 40. The details will be discussed later by reference to FIG. 8.

A face region detector 120 detects a region corresponding to the face of the player from the frame. This can be accomplished by a matching using a reference image of a face in a similar manner to the intra-frame position identifying unit 114.

A body region estimating unit 124 estimates a region corresponding to the body of the player 72 captured together with the object 70 from the size, position and the like of the face region as detected by the face region detector 120. The body region may be estimated, for example, by retaining a template in the form of a person and scaling it up or down according to the size of the face region or by dividing the background in the frame by reference to the position of the face region. The illumination control unit 140 outputs the part of the whole image excluding the body region of the player, as the lighting region, to the on-screen display unit 144.

The on-screen display unit 144 produces an on-screen display of an input receiving image outputted from the input-receiving-image display unit 134 and a lighting region outputted from the illumination control unit 140 on a mirror image from the image inverting unit 104, and sends it to the image output unit 34. By the function of the image output unit 34, a screen of the input receiving image and the lighting region in superposition on the mirror image of the player is displayed on the display 40.

Figure 5A:
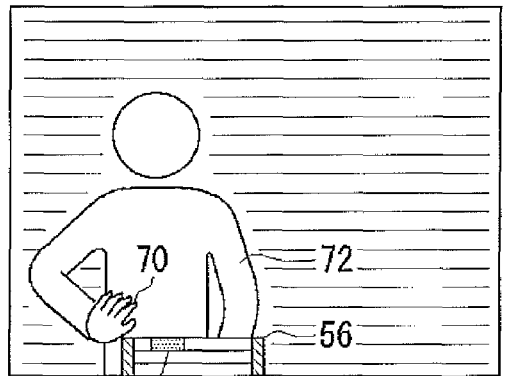
FIGS. 5($a$) to 5($d$) show examples of display of lighting regions according to the brightness of frames captured by a camera.
Figure 5B:
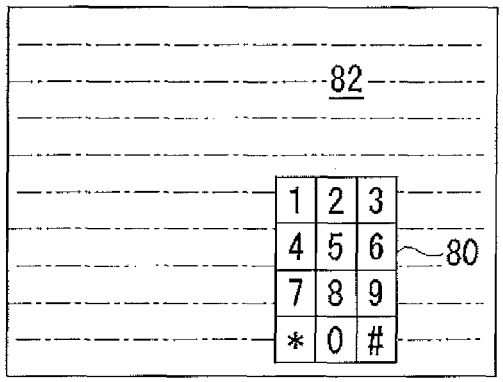
Figure 5C:
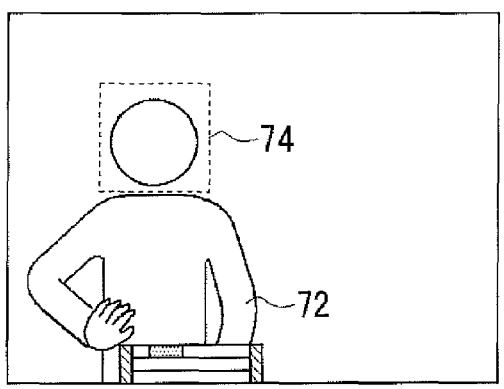
Figure 5D:
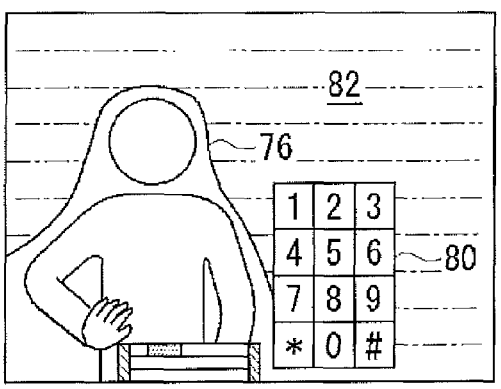

FIGS. 5(a) to 5(d) show examples of display of lighting regions according to the brightness of frames captured by the camera. FIGS. 5(a) and 5(c) show each a whole frame as captured by the camera 20 and outputted after a left-right reversal by the image inverting unit 104. FIGS. 5(b) and 5(d) are respectively images as displayed on the display 40 to be recognized by the player 72 when the frames of FIGS. 5(a) and 5(b) are acquired by the processing unit 32, which are the whole screens displayed on the display by the on-screen display unit 144 with an input receiving image 80 or a lighting region 82 superposed on the mirror image.

As shown in FIG. 5(a), projected in the frame are the direct images of the player 72, the object 70, and the reflector 50. The reflecting surface region identifying unit 112 identifies in advance a reflecting surface region 50' by detecting the markers 56 from the frame.

The arrangement may be such that a default image of the reflecting surface region 50' is stored when the camera 20 and the image processing device 30 are switched on and in a standby state. In the standby state, there exists nothing but the background above the first entry region 62 and the second entry region 64. Hence, storing a default image makes it possible to easily find a difference when the object has entered the first entry region 62 and the second entry region 64, and this realizes a robust detection processing of reflected images of the object within the reflecting surface regions.

FIGS. 5(a) to 5(d) are illustrations representing a case where the object 70 operated by the player 72 has entered the first entry region 62. As a result of the object 70 entering the first entry region 62, a reflected image 70a of the object 70 is projected in the region corresponding to the first reflecting surface 52. The depth position detecting unit 122 detects this reflected image 70a by finding the difference in reflecting surface region between frames.

Assume that at the time of image pickup of FIG. 5(a), the room in which the player 72 is present is dimly-lit and does not provide sufficient illumination. As the object operated by the player enters the first entry region 62, the action thereof is identified by the action identifying unit 132, and in response to it the input-receiving-image display unit 134 causes the input receiving image 80 to be displayed on the display 40. The illumination determining unit 116 determines the insufficient illumination of the space to be captured, based on the output of a photosensor or through an analysis of a frame. Thereupon, the illumination control unit 140 causes an image with raised lightness or brightness, using the part of the whole image excluding the input receiving image 80 as the lighting region 82, to be displayed on the display 40 (see FIG. 5(b)). The lighting region displayed on the display 40 lights up the object 70 and the player 72, thereby making the frame to be captured by the camera 20 brighter.

FIG. 5(c) shows a frame captured by the camera 20 when the object 70 and the player 72 are lit up by the lighting region 82. As the illumination determining unit 116 determines the presence of sufficient illumination, the face region detecting unit 120 detects a face region 74 corresponding to the face of the player 72 within the frame. The body region estimating unit 124 estimates a body region 76 corresponding to the body of the player 72 based on the detected face region. The illumination control unit 140 cuts out a part corresponding to the body region 76 estimated by the body region estimating unit 124 from the lighting region 82 and outputs it to the on-screen display unit 144. As the on-screen display unit 144 superimposes these images, a part around the body of the player 72 is displayed as the lighting region 82 as illustrated in FIG. 5D. In the transition from FIG. 5(b) to FIG. 5(d), the illumination control unit 140 may also cause a display of the lighting region 82 with the lightness or brightness further raised to compensate for the reduction in area of the lighting region 82.

In this manner, the images of the object 70 and the player 72 and the input receiving image 80 are displayed on the display 40, so that the function of an input interface is performed. At the same time, the lighting region 82 is also displayed on the display 40, so that the function of lighting the object can also be performed.

Also, by using the entry of the object 70 in the entry regions 62 and 64 set by the reflector 50 as a switch to display the lighting region, it is possible to light up the object 70 when the player 72 attempts to give instructions to the input receiving image 80 by operating the object 70. The arrangement may be such that the illumination control unit 140 turns off the display of the lighting region 82 when the player 72 returns the object 70 to a position closer to himself/herself than the first entry region 62 after completing instructions to the input receiving image 80. Then the display 40 no longer keeps emitting unnecessary light and functions as an illuminator only when it must serve as an input interface. And this helps to save energy. Moreover, the lighting up of the screen of the display 40 at the entry of an object in the entry regions 62 and 64 can provide a stage effect to the player.

Also, more detailed control can be accomplished by using the entry of the object into the two entry regions 62 and 64 separately. For example, it may be so arranged that at the entry of the object 70 in the first entry region 62 the sleep status of the display 40 is canceled and at the entry of the object 70 in the second entry region 64 the tracking of the object is started with the lighting region 82 displayed on the display 40. As the object 70 is returned from the second entry region 64 to the first entry region 62, the display of the lighting region 82 may be turned off and mirror images of frames captured by the camera 20 may be displayed just as they are on the display 40. Further, as the object 70 is moved back from the first entry region 62 closer to the player, the display 40 may be sent back into a sleep status again.

Further, when the two reflecting surfaces 52 and 54 of the reflector 50 are disposed with a little wider separation therebetween in the depth direction (e.g., several tens of centimeters), the lightness or brightness of the lighting region 82 may be varied between them because there may be a greater difference in distance between the object 70 and the display 40 between when the object 70 is in the first entry region 62 and when it is in the second entry region 64. In such a case, information on the position where the object 70 is detected is communicated by the action identifying unit 132 to the illumination control unit 140, and the illumination control unit 140 increases or decreases the lightness or brightness of the lighting region 82 according to which of the regions the object is present.

Figure 6:
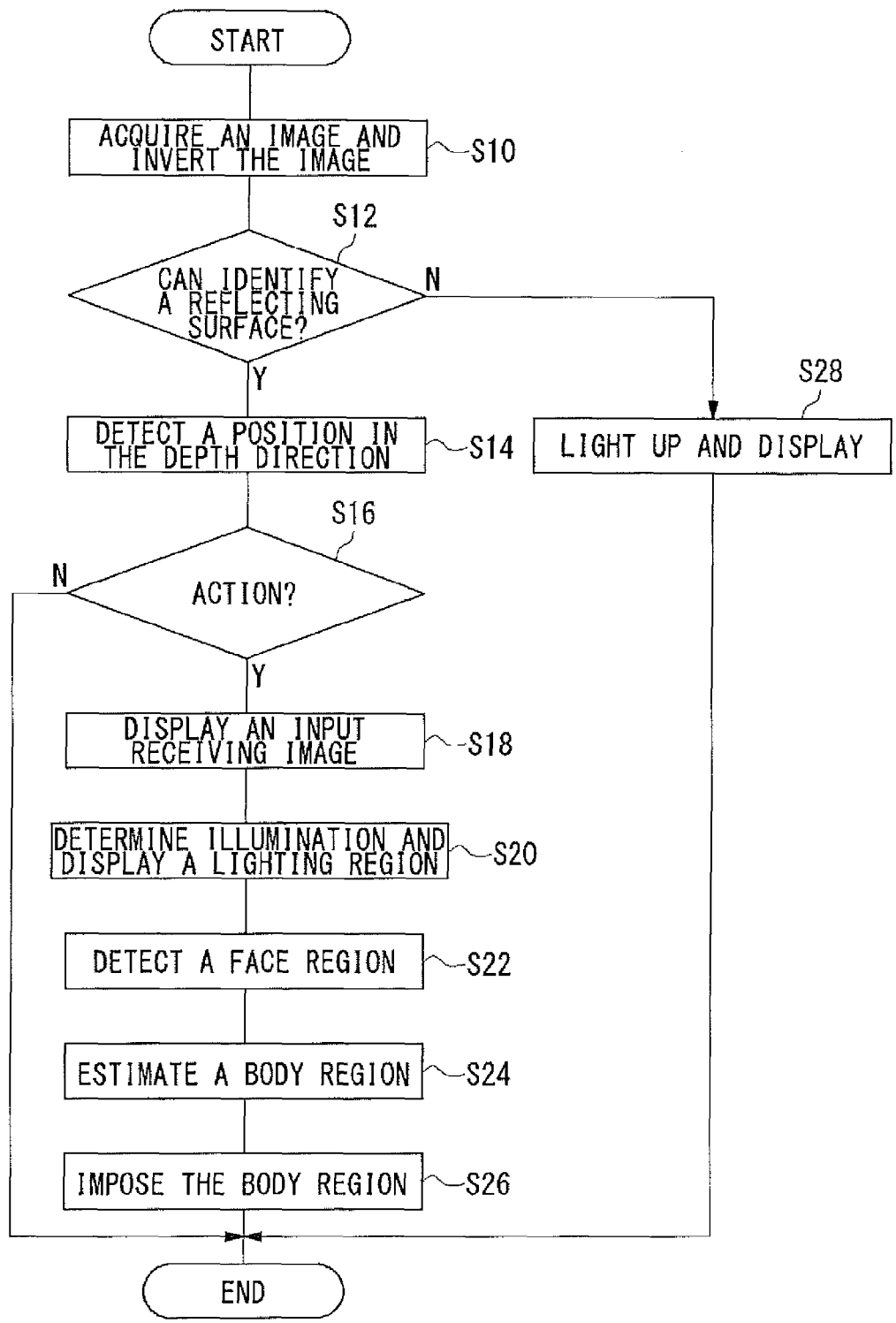
FIG. 6 is a flowchart of a process of displaying a lighting region according to an exemplary embodiment of FIG. 5.

FIG. 6 is a flowchart of a process of displaying a lighting region according to the exemplary embodiment of FIG. 5.

First a frame captured by a camera 20 is acquired, and a mirror processing is performed thereon (S10). The reflecting surface region identifying unit 112 identifies a reflecting surface region by detecting markers 56 from within the frame. If the illumination is insufficient and the reflecting surface region cannot be identified (N of S12), the illumination control unit 140 lights up the whole screen once so that the reflecting surface region can be identified (S28). When the reflecting surface region is identified (Y of S12), the depth position detecting unit 122 detects the difference between reflecting surface regions in a plurality of frames and thereby detects the position of the object in the depth direction (S14). The action identifying unit 132 determines whether a predetermined action has been performed or not, using the information of the depth position of the object (S16). If the action has not been performed (N of S16), the flow of this process comes to an end.

If the action has been performed (Y of S16), the input-receiving-image display unit 134 causes an input receiving image to be displayed on the display (S18). The illumination determining unit 116 determines the illumination of a space to be captured by the camera and causes a lighting region to be displayed on the display (S20). The face region detecting unit 120 detects a face region of the player from within the frame (S22), and further the body region estimating unit 124 estimates a body region of the player and delivers the information to the illumination control unit 140 (S24). The illumination control unit 140 sends a lighting region with the part corresponding to the body region cut out therefrom to the on-screen display unit 144, and the on-screen display unit 144 causes a screen with the lighting region surrounding the body region to be displayed on the display 40 (S26).

FIGS. 7(a) to 7(d) show another exemplary embodiment for displaying lighting regions according to the brightness of frames captured by the camera. In this exemplary embodiment, the parameter of the lighting region 82, such as lightness or brightness, is adjusted according to the condition of the space to be captured by the camera.

Figure 7A:
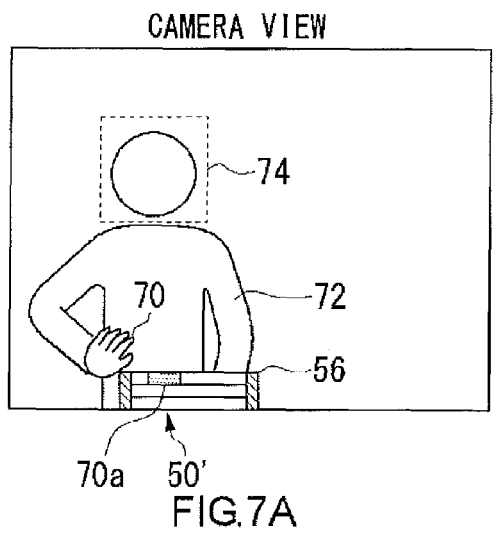
FIGS. 7($a$) to 7($d$) are diagrams showing another exemplary embodiment for displaying lighting regions according to the brightness of frames captured by a camera.
Figure 7B:
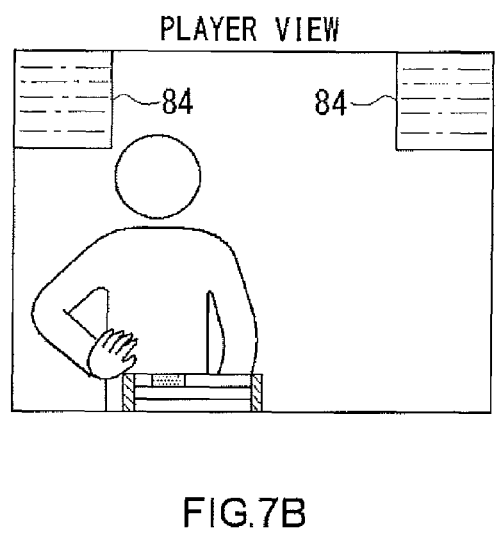
Figure 7C:
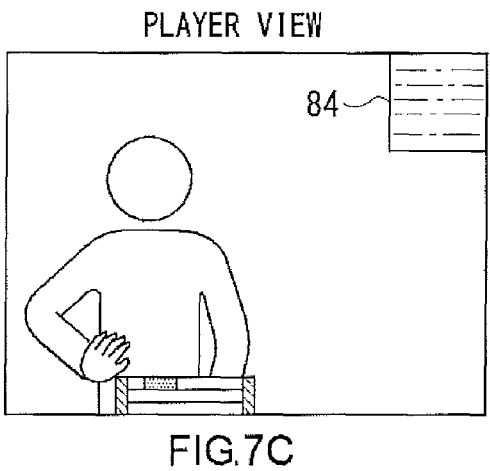
Figure 7D:
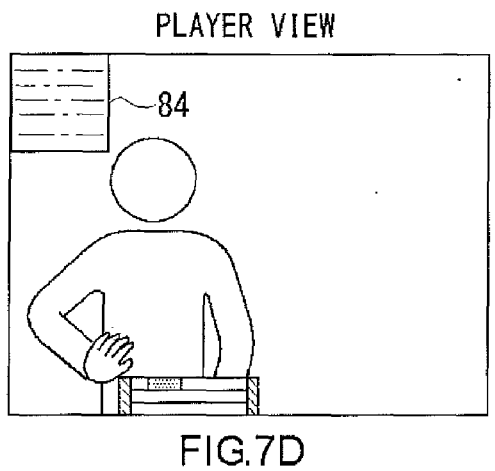

FIGS. 7(b) to 7(d) are respectively images, displayed on the display, to be recognized by the player when the frame of FIG. 7(a) is acquired by the processing unit 32, which are the whole screens displayed with a lighting region superposed on the mirror image.

The illumination determining unit 116 determines whether the illumination of the space surrounding the object is sufficient or not, based on an analysis of a frame or a signal from a photosensor. Also, as shown in FIG. 7(a), the face region detecting unit 120 detects a region of the face of the player. According to the insufficiency of illumination, the illumination determining unit 116 determines whether to display the lighting region 84 in the top-left and top-right corners of the display as shown in FIG. 7(b) or in one of the top-left and top-right corners of the display as shown in FIGS. 7(c) and 7(d). The illumination control unit 140 causes the lighting region 84 to be displayed in such a manner that it is not superposed on the face region.

The lightness or brightness of the lighting region 84 may be fixed or may be varied according to the distance between the display 40 and the object 70. In the former case, an assumed distance is decided in advance according to the recommended location of the reflector 50 relative to the display 40 for instance, and the brightness of the lighting region is so set that it can light up the object with an illumination set according to the assumed distance. In the latter case, the distance between the display 40 and the object 70 may be estimated by the distance estimating unit 146, and the lightness or brightness of the lighting region may be changed based on the information as will be discussed later.

Also, every time the brightness of the lighting region is changed by the illumination control unit 140, the illumination may be determined by the illumination determining unit 116, and the brightness of the lighting region may be increased or decreased accordingly. In so doing, it is possible to determine, in a trial-and-error manner, the lightness or brightness of the lighting region that can illuminate the object with a proper lightness.

Figure 8A:
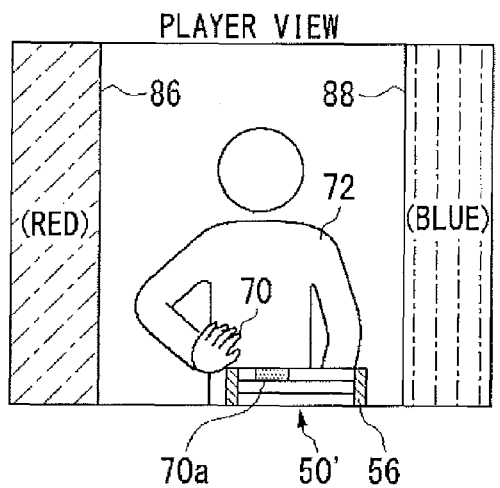
FIGS. 8($a$) to 8($c$) are diagrams showing still another exemplary embodiment for displaying a lighting region with an input interface apparatus used.
Figure 8B:
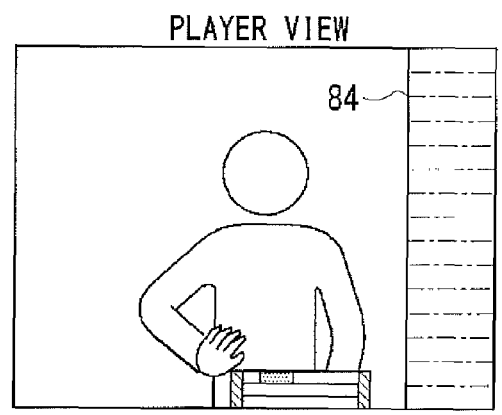
Figure 8C:
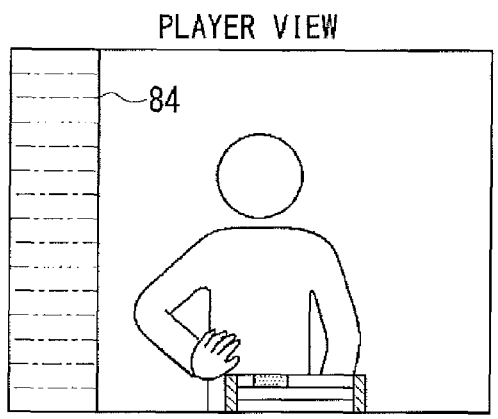

FIGS. 8(a) to 8(c) show still another exemplary embodiment for displaying a lighting region in the input interface apparatus 10. In this exemplary embodiment, the amount of information obtainable from a frame captured by the camera is increased by actively controlling the display time, display position, and color emission of the lighting region.

As shown in FIG. 8(a), the illumination control unit 140 may cause a plurality of lighting regions 86 and 88 of different colors (red and blue in the Figure) to be displayed on the display sequentially for a short time each. And the color analyzing unit 148 may acquire frames captured by the camera 20 when the lighting regions 86 and 88 of different colors are respectively displayed on the display and obtain color information on the object in the space to be captured by the camera, based on the change of color between those frames.

Also, as shown in FIGS. 8(b) and 8(c), the illumination control unit 140 may cause a lighting region 84 belonging to the left half or the right half of the display to be displayed thereon sequentially for a short time each. And the distance estimating unit 146 may acquire frames captured by the camera 20 when the left and right lighting regions 84 are respectively displayed on the display and estimate the distance of the object in the space to be captured by the camera from the display by finding the difference between those frames.

Figure 9:
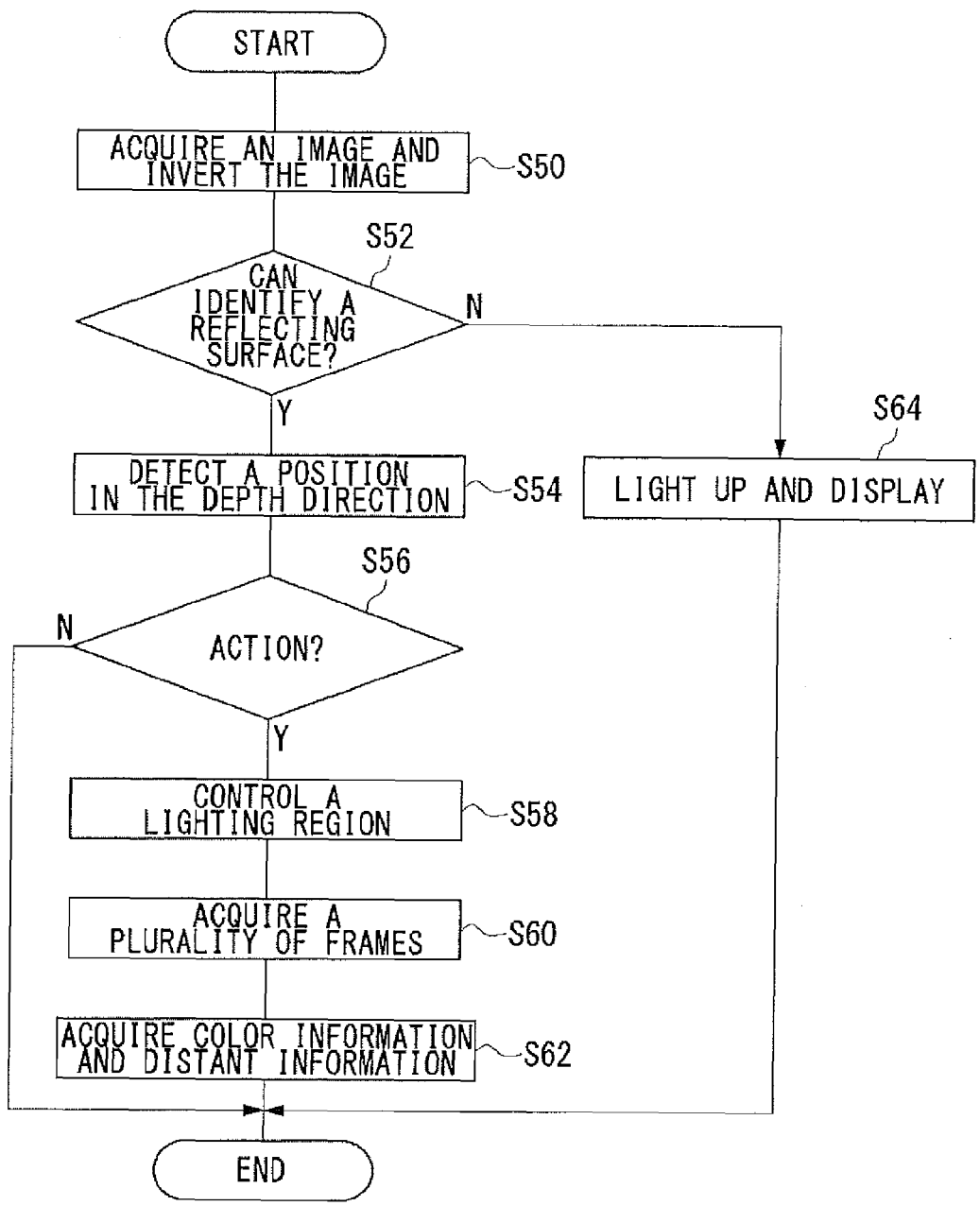
FIG. 9 is a flowchart of a process of displaying a lighting region according to an exemplary embodiment of FIG. 8.

FIG. 9 is a flowchart of a process of displaying a lighting region according to the exemplary embodiment of FIG. 8. The processings of S50 to S56 are the same as those of S10 to S16 of FIG. 6.

If an action has been performed (Y of S56), the illumination control unit 140 causes the lighting regions of different colors to be displayed sequentially on the display or causes the lighting region to be displayed sequentially on the right and the left of the display (S58). The distance estimating unit 146 or the color analyzing unit 148 acquires frames captured by the camera when the respective lighting regions are displayed on the display (S60). And they acquire color information or distance information on the space to be captured by the camera by finding differences between a plurality of frames (S62).

As described hereinabove, the present embodiment of the invention makes a positive use of the display as an illuminator in an input interface apparatus for recognizing the motion of an object. If the player uses the input interface apparatus in a dark or dimly-lit room, frames captured by a camera will be dark too. The input interface apparatus, which is an apparatus for receiving inputs by detecting an object in frames, cannot perform any further processing on a frame which remains dark. In the light of this, the brightness of the object is secured by automatically brightening up the display.

The view angle of high-definition television increasingly popular in recent years is much wider than that of conventional tube television or LCD television. Thus it is expected that when a viewer tries to watch television at a appropriate view angle, the distance between the viewer and the display gets much closer. Under such circumstances, lighting up the display may ensure necessary illumination for game playing even when the room is not well lit.

Once a face region and a body region are identified with the lighting region displayed, only parts that are not required as input interface are used as lighting regions. Distinguishing the lighting region from the parts that must be visually recognized by the player, namely an input instruction screen and the player's own image that are the essential parts for the interface, makes it unnecessary to lighting up the whole screen, and this feature helps save energy too.

Also, when the number of bits of lightness data or brightness data of a frame is increased, a larger amount of information can be obtained by raising the illumination for the object, and this can be applied to a variety of image processings.

As above, the invention has been described based on the exemplary embodiments. The above-described embodiments are intended to be illustrative only and it will be obvious to those skilled in the art that various modifications to any combination of constituting elements and processes could be developed and that such modifications are also within the scope of the present invention. Optional combinations of the aforementioned constituting elements described in the embodiments, and implementations of the invention in the form of methods, apparatuses, systems, computer programs and so forth may also be effective as additional modes of the present invention.

In the above embodiments, description has been given of the reflector 50 provided with two reflecting surfaces 52 and 54. However, the number of reflecting surfaces may be one or even three or more. When there is only one reflecting surface, it is not possible to identify such action as the pushing-in and pulling-out of an object by the player, but it is at least possible to determine whether the object is within the entry region corresponding to the reflecting surface or not. When there are three or more reflecting surfaces, entry regions may be set corresponding thereto and it may be determined by a depth position detector whether the object has entered each of the entry regions or not, in much the same manner as hereinbefore described. By increasing the number of reflecting surfaces, it is possible to identify more complex action of the player, and along with the action, the lighting region can be controlled more in detail. For example, more gradations can be given to the lightness or brightness of the lighting region according to the position of the object.

In the above embodiments, description has been given of illuminating the object by displaying a lighting region on the display. However, the arrangement may be such that the illumination control unit gives a signal to a control circuit of the display to raise the brightness of the screen. In such a case, it may be so arranged that a command for starting or stopping a sleep mode is given to the control circuit of the display, according to the information on whether the object is in the first entry region or the second entry region.

In the above embodiments, description has been given of projecting the mirror images of the player and the object on the display. However, the arrangement may be such that the moving images as captured by the camera are not projected on the display.

The present invention secures the brightness of an object, the image of which is to be taken, in an input interface apparatus for recognizing the motion of the object as input.

The invention claimed is:

1. An image processing method, comprising:
capturing an image of an object operated by a player,
detecting a three-dimensional position of the object based on a captured frame,
identifying an action of the player based on a result of detecting the object,
receiving the action as an instruction to an input-receiving image displayed on a display,
determining whether or not a brightness measured in the playing environment for a user is under a predetermined reference value, and
in case that the brightness measured in the playing environment of the user is under the predetermined reference value, raising, in response to the action, the brightness of the image projected on the display higher than that before the action is detected.

2. An input interface apparatus, comprising:
a camera which captures an image of an object operated by a player;
a position detector which detects the three-dimensional position of an object based on a captured frame;
an action identifying unit which identifies an action of the player based on a result of detecting the object;
an input receiving unit which receives the action as an instruction to an input-receiving image displayed on a display;
a determining unit which determines whether or not a brightness measured in the playing environment for a user is under a predetermined reference value;
an illumination control unit which, in case that the brightness measured in the playing environment of the user is under the predetermined reference value, raises, in response to the action, the brightness of the image projected on the display higher than that before the action is detected; and
a reflector which is positioned such that a reflected image of the object is projected to the camera and which causes the camera to capture the reflected image of the object together with a direct image thereof, wherein a plurality of entry regions are provided by the reflector and the brightness of the image is changed in accordance with which of the entry regions the object is positioned.

3. An input interface apparatus according to claim 2, wherein the illumination control unit raises the brightness of the image by displaying a lighting region with a higher lightness or brightness than that of the captured frame on the display.

4. An input interface apparatus according to claim 3, wherein the illumination control unit uses a part of the whole image excluding an input image for receiving an input instruction in accordance with the motion of the object, as the lighting region.

5. An input interface apparatus according to claim 3, wherein the illumination control unit uses a part of the whole image excluding the image of player captured together with the object, as the lighting region.

6. An input interface apparatus according to claim 3, further comprising an image analyzing unit which estimates the brightness of a space to be captured,
wherein when the brightness of the object is determined to be insufficient, the illumination control unit raises the brightness of the lighting region to accurately detect the object.

7. An input interface apparatus according to claim 6, wherein a parameter of the lighting region is adjusted based on the brightness of a space to be captured.

8. An input interface apparatus according to claim 3, wherein the illumination control unit causes a lighting region contained in a right half of the display and that contained in a left half thereof to be displayed alternately on the display,
the apparatus further comprising a distance estimating unit which estimates a distance of the object in the space to be captured from the display, by acquiring frames captured when either the right lighting region or left lighting region is displayed on the display by the illumination control unit and by detecting the difference between the acquired frames.

9. An input interface apparatus according to claim 3, wherein the illumination control unit causes a plurality of lighting regions of different colors to be sequentially displayed on the display,
the apparatus further comprising a color analyzing unit which acquires frames captured respectively when lighting regions of different colors are displayed on the display by the illumination control unit and, based on the variation of colors among the acquired frames, acquires color information on the object in the space to be captured.

10. An input interface apparatus according to claim 2, wherein the illumination control unit raises the brightness of the image by displaying a lighting region with a higher lightness than that of the captured frame on the display.

11. An input interface apparatus according to claim 4, wherein the illumination control unit uses a part of the whole image excluding the image of player captured together with the object, as the lighting region.

12. An input interface apparatus according to claim 4, further comprising an image analyzing unit which estimates the brightness of a space to be captured,
wherein when the brightness of the object is determined to be insufficient, the illumination control unit raises the brightness of the lighting region to accurately detect the object.

13. An input interface apparatus according to claim 5, further comprising an image analyzing unit which estimates the brightness of a space to be captured, wherein when the brightness of the object is determined to be insufficient, the illumination control unit raises the brightness of the lighting region to accurately detect the object.

14. An input interface apparatus according to claim 4, wherein the illumination control unit causes a lighting region contained in a right half of the display and that contained in a left half thereof to be displayed alternately on the display, the apparatus further comprising a distance estimating unit which estimates a distance of the object in the space to be captured from the display, by acquiring frames captured when either the right lighting region or left lighting region is displayed on the display by the illumination control unit and by detecting the difference between the acquired frames.

15. An input interface apparatus according to claim 5, wherein the illumination control unit causes a lighting region contained in a right half of the display and that contained in a left half thereof to be displayed alternately on the display, the apparatus further comprising a distance estimating unit which estimates a distance of the object in the space to be captured from the display, by acquiring frames captured when either the right lighting region or left lighting region is displayed on the display by the illumination control unit and by detecting the difference between the acquired frames.

16. An input interface apparatus according to claim 4, wherein the illumination control unit causes a plurality of lighting regions of different colors to be sequentially displayed on the display, the apparatus further comprising a color analyzing unit which acquires frames captured respectively when lighting regions of different colors are displayed on the display by the illumination control unit and, based on the variation of colors among the acquired frames, acquires color information on the object in the space to be captured.

17. An input interface apparatus according to claim 5, wherein the illumination control unit causes a plurality of lighting regions of different colors to be sequentially displayed on the display, the apparatus further comprising a color analyzing unit which acquires frames captured respectively when lighting regions of different colors are displayed on the display by the illumination control unit and, based on the variation of colors among the acquired frames, acquires color information on the object in the space to be captured.

18. An input interface apparatus according to claim 12, wherein a parameter of the lighting region is adjusted based on the brightness of a space to be captured.

19. An input interface apparatus according to claim 13, wherein a parameter of the lighting region is adjusted based on the brightness of a space to be captured.

* * * * *